US008290841B2

(12) United States Patent
Beigi et al.

(10) Patent No.: US 8,290,841 B2
(45) Date of Patent: Oct. 16, 2012

(54) SYSTEM AND METHOD FOR AUTOMATICALLY GENERATING SUGGESTED ENTRIES FOR POLICY SETS WITH INCOMPLETE COVERAGE

(75) Inventors: Mandis S. Beigi, White Plains, NY (US); Carolyn Brodie, Briarcliff Manor, NY (US); Seraphin Bernard Calo, Cortlandt Manor, NY (US); David Alson George, Somers, NY (US); Clare-Marie Karat, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 12/195,501

(22) Filed: Aug. 21, 2008

(65) Prior Publication Data
US 2010/0049558 A1   Feb. 25, 2010

(51) Int. Cl.
*G06Q 40/00* (2012.01)
(52) U.S. Cl. ............... 705/35; 726/25; 726/26
(58) Field of Classification Search .......... 705/35 R–37, 705/4, 35
See application file for complete search history.

(56) References Cited

U.S. PATENT DOCUMENTS

| | | | |
|---|---|---|---|
| 6,021,397 A * | 2/2000 | Jones et al. .......... | 705/36 R |
| 6,871,284 B2 | 3/2005 | Cooper et al. | |
| 7,047,288 B2 * | 5/2006 | Cooper et al. .......... | 709/223 |
| 7,930,727 B1 * | 4/2011 | Baize et al. .......... | 726/1 |
| 2001/0042785 A1 * | 11/2001 | Walker et al. .......... | 235/379 |
| 2004/0117302 A1 * | 6/2004 | Weichert et al. .......... | 705/40 |
| 2005/0268326 A1 | 12/2005 | Bhargavan et al. | |
| 2006/0005228 A1 | 1/2006 | Matsuda | |
| 2007/0180490 A1 | 8/2007 | Renzi et al. | |
| 2008/0282320 A1 * | 11/2008 | DeNovo et al. .......... | 726/1 |
| 2009/0055431 A1 * | 2/2009 | Brodie et al. .......... | 707/103 R |

OTHER PUBLICATIONS

McAfee IntruShield; Jul. 29, 2004.*
IT Audit: Security Beyond the Checklist; Tanya Baccum, Jul. 18, 2001.*
Chang et al., Automatic Generation of Conflict-Free IPsee Policies; Formal Techniques for Networked and Distributed Systems—FORTE 2005. IFIP WG 6.1 International Conference, 25th, Taipei, Oct. 2-5, 2005; Proceedings (Lecture Notes in Computer Science, Vo. 3731); pp. 233-246.

* cited by examiner

*Primary Examiner* — Olabode Akintola
*Assistant Examiner* — Abhishek Vyas
(74) *Attorney, Agent, or Firm* — Tutunjian & Bitetto, P.C.; Preston J. Young

(57) ABSTRACT

A system and method for determining policy coverage and generating a suggested policy for gaps in the policy coverage includes determining policy coverage for one or more policies in a policy coverage space and determining regions uncovered by the policy coverage in the policy coverage space. Suggested policies are generated to cover the regions uncovered by the policy coverage. The policy coverage is supplemented with the suggested polices to complete coverage of a policy set.

21 Claims, 8 Drawing Sheets

SYSTEM AND METHOD FOR AUTOMATICALLY GENERATING SUGGESTED ENTRIES FOR POLICY SETS WITH INCOMPLETE COVERAGE

BACKGROUND

1. Technical Field

The present invention relates to policy management defined for systems that automatically apply policies, and more particularly to systems and methods for policy authoring and generating suggested entries for policy sets where coverage is not complete or in conflict.

2. Description of the Related Art

Policy management is becoming more pervasive as a de facto means to specify automatic adjustment of managed entities according to a pre-planned set of circumstances in a "domain space". There are countless domains, such as those involving heating, ventilation and air condition (HVAC) regulation in occupied spaces, processes in manufacture, operating schema for hand held devices, information processing systems for finance, health and a vast plurality of other private and public sector activities.

Policy applies to managing some kind of entity. Entities apply to device settings and adjustments, mechanical reconfiguration, permitting access, denying access, altering data, deleting data, adding data, and a plurality of other applications of a decision.

The application area is often referred to as Domain/Scope. A policy includes a statement that specifies an effective domain, a condition including at least one logical expression that can be evaluated to determine current triggering and a decision that describes the consequence to actual triggering. Other factors commonly found in building policies for automatic deployment include stating a purpose which effectively extends the condition logic, a priority which permits specifying an always present default policy and may serve as a conflict resolver, a dynamic adaptability factor which can provide a way for a policy to be temporarily in effect instead of constantly in effect and, finally, cost which provides a resolver with yet another way to determine a course of action.

In many instances, a plurality of policy statements is adjoined in a set for which there is no corresponding default policy. This circumstance is very common in the art. A corollary to this problem is in security policies where there is generally a default rule that says "no access". Such domains include managing devices. A problem potentially exists for circumstances unforeseen by the policy author. A managed entity might enter into a state defined by sensors, amounts, time of day, and day of week and similar physical and temporal factors that could impair obtaining expected results. In the worst case scenario, a system catastrophic failure could ensue.

SUMMARY

A method, system and program storage device are provided for enhancing the task of generating supplemental policies for a policy set that has incomplete coverage of the desired scope of sensor values for a target policy managed system. After composing a natural language statement of policies, the user can run an analysis of those policies and not only expose deficiencies, but receive suggested policies for completing the set. The user need only decide what decisions are to be rendered by the supplemental policies before adopting them into the final design. Present embodiments focus on the circumstance where a plurality of policy statements is adjoined in a set and for which there is no corresponding default policy to provide the missing policies. Another solution includes resolving conflicts between policies in a set or removing redundant policies.

A system and method for determining policy coverage and generating a suggested policy for gaps in the policy coverage includes determining policy coverage for one or more policies in a policy coverage space and determining regions uncovered by the policy coverage in the policy coverage space. Suggested policies are generated to cover the regions uncovered by the policy coverage. The policy coverage is supplemented with the suggested polices to complete coverage of a policy set.

A method to automatically generate suggested policies that fulfill the intended expectation of initial policies is provided. The policy domain is defined, identifying attributes including sensors, applicable temporal factors, system state, and other factors affecting the composition of the policy condition. The applicable ranges of all attributes of are also defined. User-authored policies are analyzed, providing interim errata defining problems. The process is stopped at this juncture if no problems exist. Otherwise, it continues as follows.

At least one suggested solution is generated. This may include appending an original set of policies with at least one that covers a condition "gap". A solution may also recommend removal of a redundant policy, provide a set of policies that identify at least two policies that conflict for a specific set of conditions and/or adjust at least one policy to correct an identified problem. A policy decision may be generated for a solution when the solution appears adjacent to or similar to other policies within the policy set. An "empty" policy decision may also be provided when the solution appears non-adjacent to the space covered by the policy set. Sets of policies based on user-specified criteria may be generated based on factors such as risk, cost, deployability, and plausible choices of condition.

The method may be provided prior to simulation or deployment of policies. Attributes of sensors may be of any data type, including integers, floating point numbers, characters, enumerated values, etc., and ranges of values could be handled. The possible solutions may be ranked based on established criteria.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
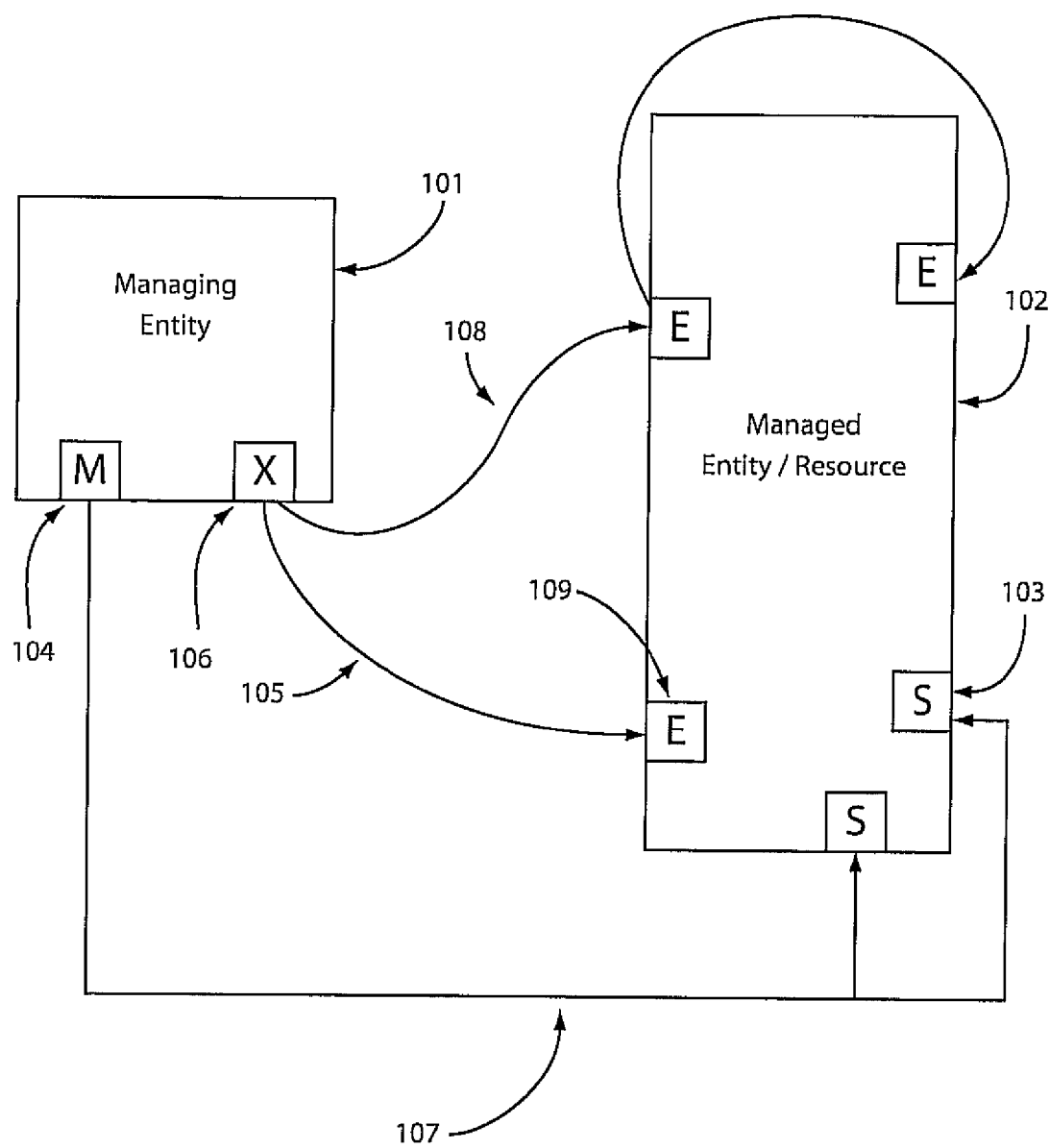
FIG. 1 is a block diagram of a simple model of a policy management system.

The present principles describe systems and methods for analyzing policy sets for adequate coverage as declared in a separate set of coverage rules and suggest placeholder policies for completing the policy set's coverage of all stipulated sensor values needing coverage. The stipulation is defined via an explicit "coverage policy". Unless otherwise provided, all numerical expressions are assumed to fit a range of values bounded on at least one end, Booleans inclusive of false and true, and any other expressions for values may include some or all possible enumerations. The "coverage policy" permits the definition of reasonable bounds for the expected ranges of sensor values that should be covered by the policy set under inspection.

In a particularly useful embodiment, U.S. Pat. No. 6,928,445, entitled: "Cost Conversant Classification of Objects", (hereinafter '445) and hereby incorporated by reference in its entirety, may be employed to build hypercubes defined by spanning trees that map the coverage of every policy in a set of a plurality of policies. The coverage is mapped such that the result (1) ascertains whether the selected policy set completely covers the policies; and, if not full coverage, (2) employing a spanning tree search, returns at least one condition combination not covered by the policy set. In the case of incomplete coverage, the present embodiments describe a method for using the results (2) above, and generate "suggested" policies that include the condition combination for each, including a temporary placeholder policy "decision". An elective process, such as a person or a default policy stipulation can supply the placeholder "decision" to convert the suggested policies into a workable set, and finally, amend the workable set to the original policy set to complete it. Further features, as well as the structure and operation of the present embodiments, are described in detail below with reference to the accompanying drawings.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a preferred embodiment of a simple model of a policy management system is illustratively shown. In this description, entities and resources may be a computer apparatus, computer programs running on an apparatus, devices that are mechanical, electrical and any plurality of such arrangements. A managing entity 101 and a managed entity/resource 102 may physically exist within the same space, or be located remotely from one another. The managing entity 101 has at least one monitoring (M) port 104 that by a physical or logical connection 107 obtains serial or simultaneous sensor values from at least one sensor (S) point 103 on the managed entity 102. The managing entity 101 then applies a policy decision on an effective policy set, using a stored state. Optionally, in addition to a sensor readout, temporal factors and any additional parameter settings so supplied are employed to arrive at a decision that is carried out by applying changes to the managed entity 102 via at least one connection 105, 108 from an executor (X) interface 106 to at least one effector (E) 109 on the managed entity 102. Not diagrammed is the potential to alter an internal state in the managing entity 101 that may affect future decisions.

Figure 2:
FIG. 2 is a diagram of an example "coverage policy" supplied to define reasonable bounds to sensor values for an explicit description of one preferred embodiment.

Referring to FIG. 2, a single coverage policy 201 is a special class of policy that declares at least one condition expression 202 in a coverage policy set. The condition expression 202 declares a region of sensor values, inclusive of temporal and internal states as described with respect to FIG. 1. A region, best described as a hypercube, has a condition expression 202 that describes boundary criteria for each sensor value logically "ANDed" together. Additional policies in the coverage policy set adjoin the others in a logically joined union.

Figure 3:
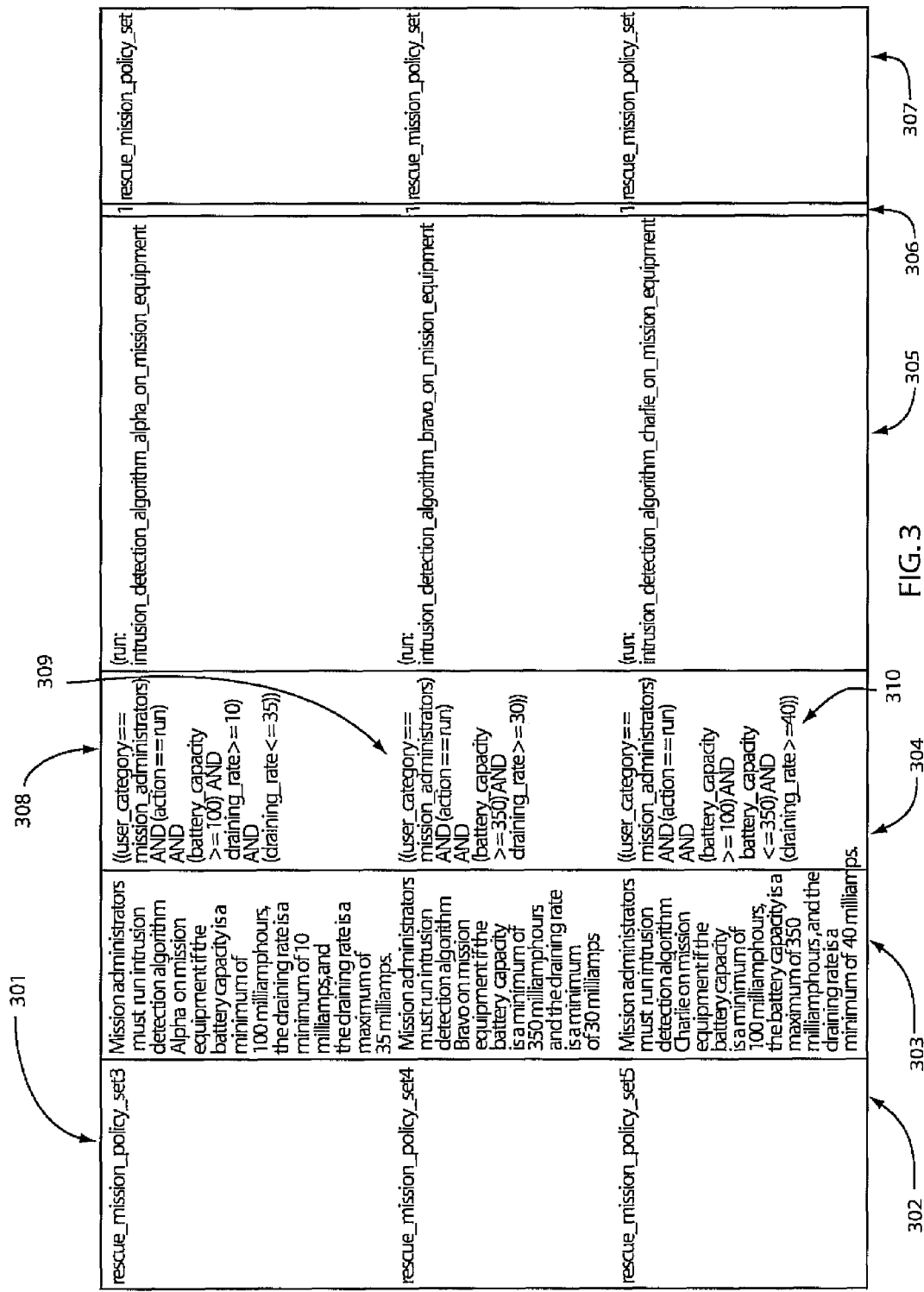
FIG. 3 shows an example of a policy set that is lacking full coverage.

Referring to FIG. 3, an example dialog 301 is shown including a policy set comprised of three policies 308, 309 and 310. Each policy 308, 309, and 310 is shown in a table view. A first column 302 provides an identification of the policy (e.g., rescue_mission_policy_set3). A column 303 includes a natural language expression of the policy (e.g., "Mission administrators . . . maximum of 35 milliamps."). A column 304 includes a logical expression that describes the applicable range of sensor values that would need be satisfied to trigger the decision described in column 305. For example, for policy 308, the applicable range of sensor values is: ((user_category==mission_administrator) AND (action==run) AND battery_capacity>=100) AND (draining_rate>=10) AND (draining_rate<=35)), and the decision is: (run: intrusions_detection_algorithm_alpha_on_mission_equipment).

Additional factors in columns 306 and 307 are importance (e.g., 1) and policy set name (e.g., rescue_mission_policy_set). The inclusion of factors for managing policies and their policy sets is optional. Such factors are generally applied in the art as conventional means to manage content.

Figure 4:
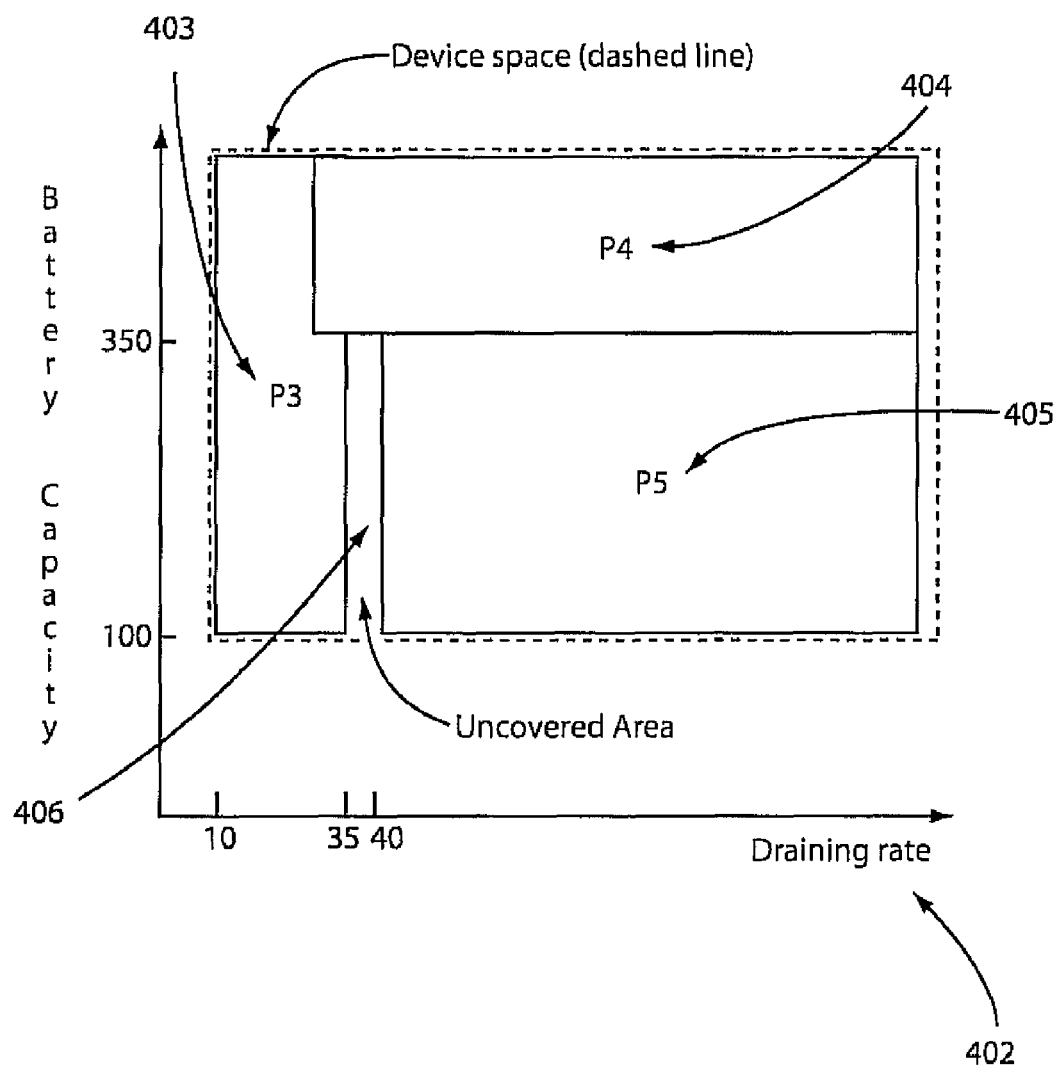
FIG. 4 shows an example of a map that illustrates a policy set that is lacking full coverage due to an uncovered area.

Referring to FIG. 4, a map illustrating policy coverage for the policies appearing in FIG. 3 is provided. In the present examples, policy guidance is illustratively described for a handheld communications unit and a preferred encryption algorithm the unit may deploy based on policies. For simplification, ranges for "battery capacity" 401 and battery "draining rate" 402 are depicted. Policy coverage 403 applies to policy 308 (P3) in FIG. 3. Policy coverage 404 applies to policy 309 (P4) in FIG. 3. Policy coverage 405 applies to policy 310 (P5) in FIG. 3. A region 406 is uncovered by any of the present policy regions 403, 404, and 405. This region 406 represents a policy gap.

Figure 5:
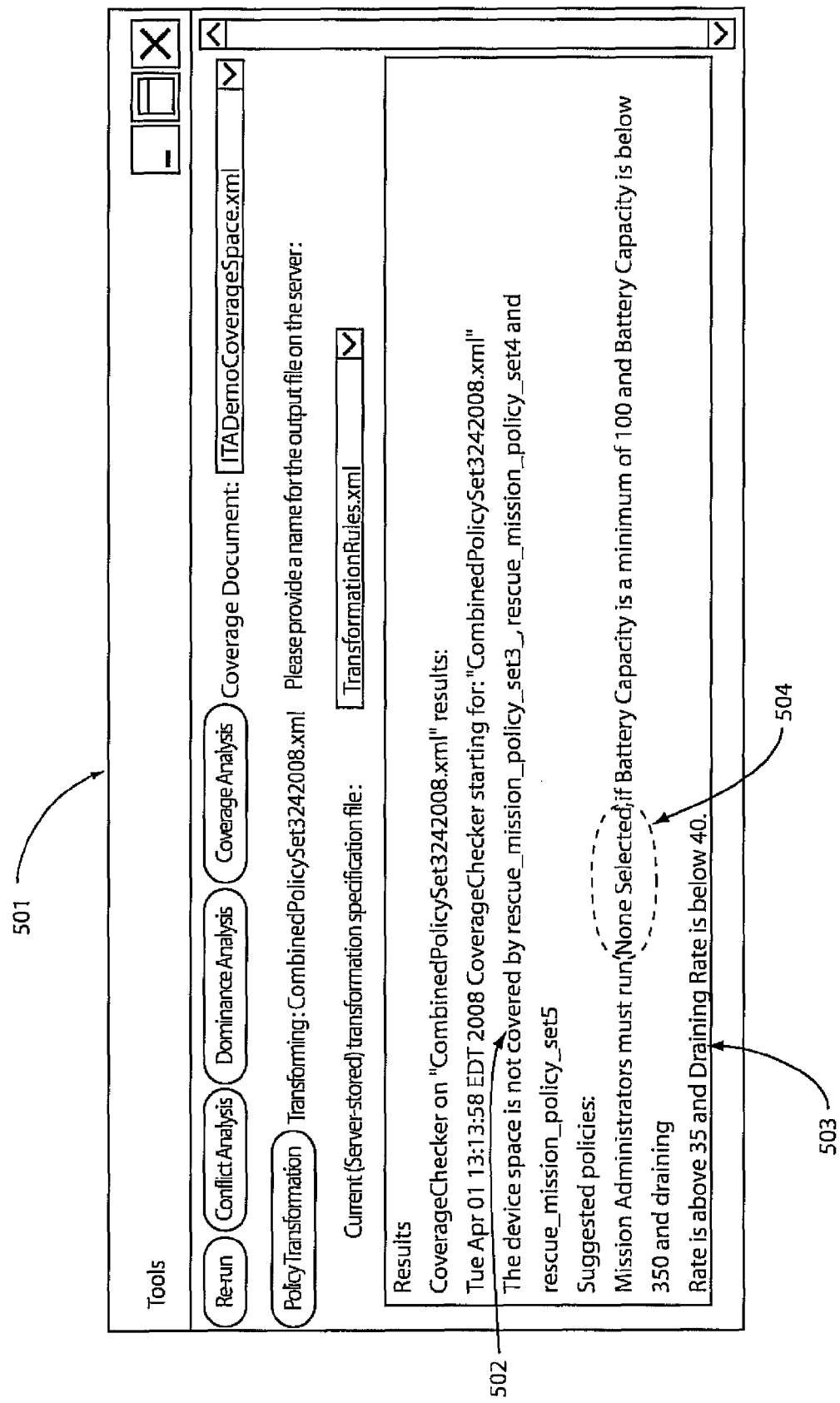
FIG. 5 shows an illustrative rendition of a dialog from a tool that performs coverage analysis, the output shown in the dialog suggests a policy that completes coverage, more than one policy may be listed.

Referring to FIG. 5, a resultant dialog box 501 is illustratively depicted from running a coverage checking process in accordance with one embodiment. During the coverage checking process, software is configured to check ranges of values of policies to search for policy gaps. In this depiction, the uncovered portion 406 in FIG. 4 has been identified. Coverage was found to be incomplete as indicated by a diagnostic message 502. However, in addition to providing the diagnostic message 502, the coverage checking process in accordance with the present principles suggests at least one policy to complete the coverage in policy suggestion message 503. The user can choose to adopt the suggested policy, and if so, must replace the "decision" placeholder 504 with an appropriate choice.

Figure 6:
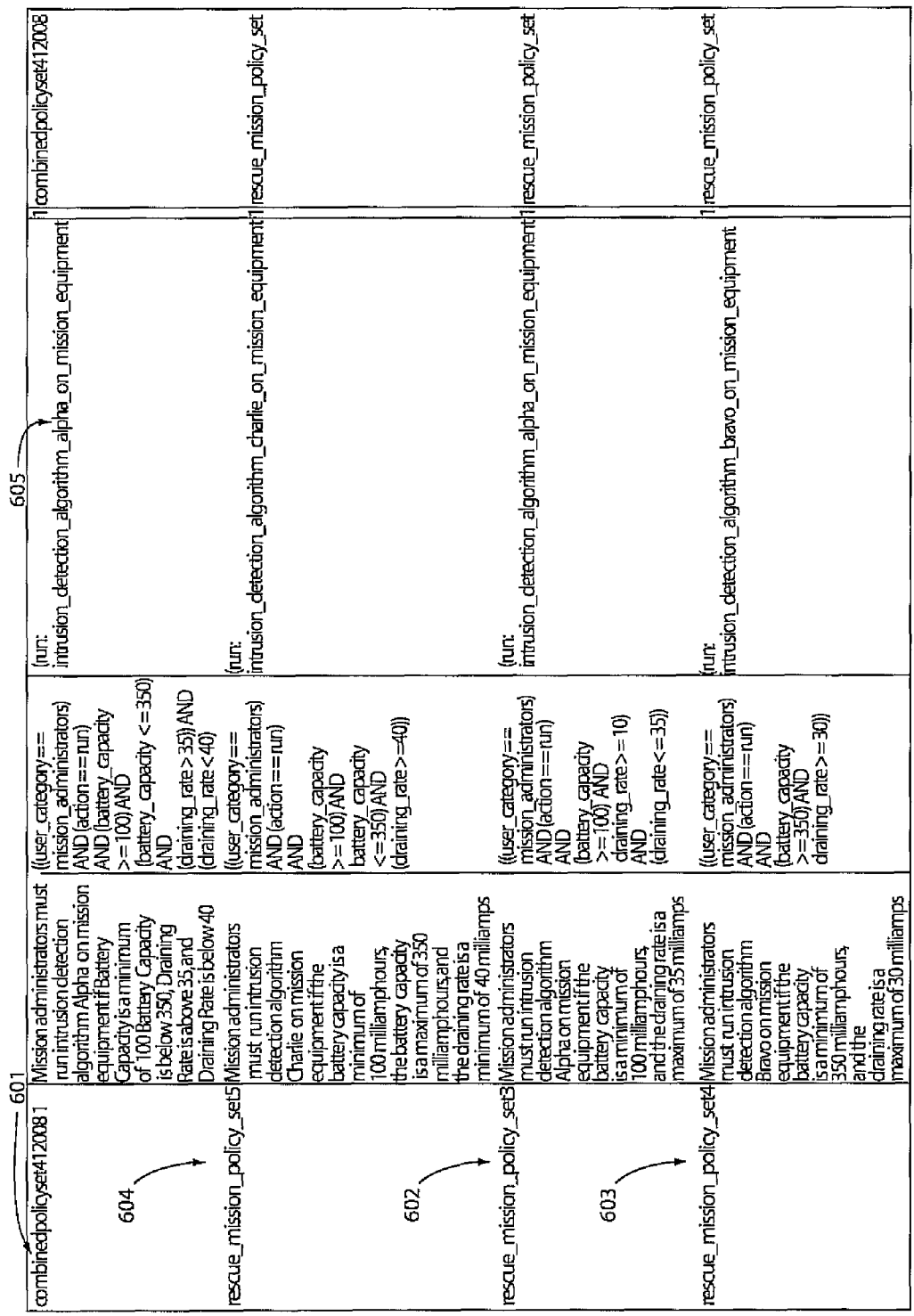
FIG. 6 shows an illustrative rendition of a dialog showing a composed policy set from FIG. 3 which has been supplemented by a "suggested" policy from FIG. 5, which has been modified by a user to have an explicit decision placed therein.

Referring to FIG. 6, the three original policies from FIG. 3 (308, 309 and 310) are now labeled as 602, 603 and 604, respectively. FIG. 6 also includes the suggested policy 601 from FIG. 5, after minor tailoring by the user to replace the circled placeholder 504 with a decision 605 suitable to the user. A policy may be suggested based upon a default user setting, a default application setting or based upon knowledge of the user or application. In one embodiment, prior histories of policy selection may be employed to predict a best policy that may be employed in a current situation. The prediction may be made based upon one or more variables that are present. For example, the policy coverage space, the subject matter of the application, the type of policies in the set, etc. may be employed as variables. Policies may also be selected at random or based on a weighting system or a probability system, where a policy is selected based on a likelihood of being selected for a given application or by a given user. Suggested policies may be based on user-specified criteria including risk, cost, deployability, plausible choices of condition, etc.

The suggested policy may also solve other problems or issues. For example, the suggestion may recommend removal of a redundant policy; provide a set of policies that identify at least two policies that conflict for a specific set of conditions; adjust at least one policy to correct an identified problem, etc.

Figure 7:
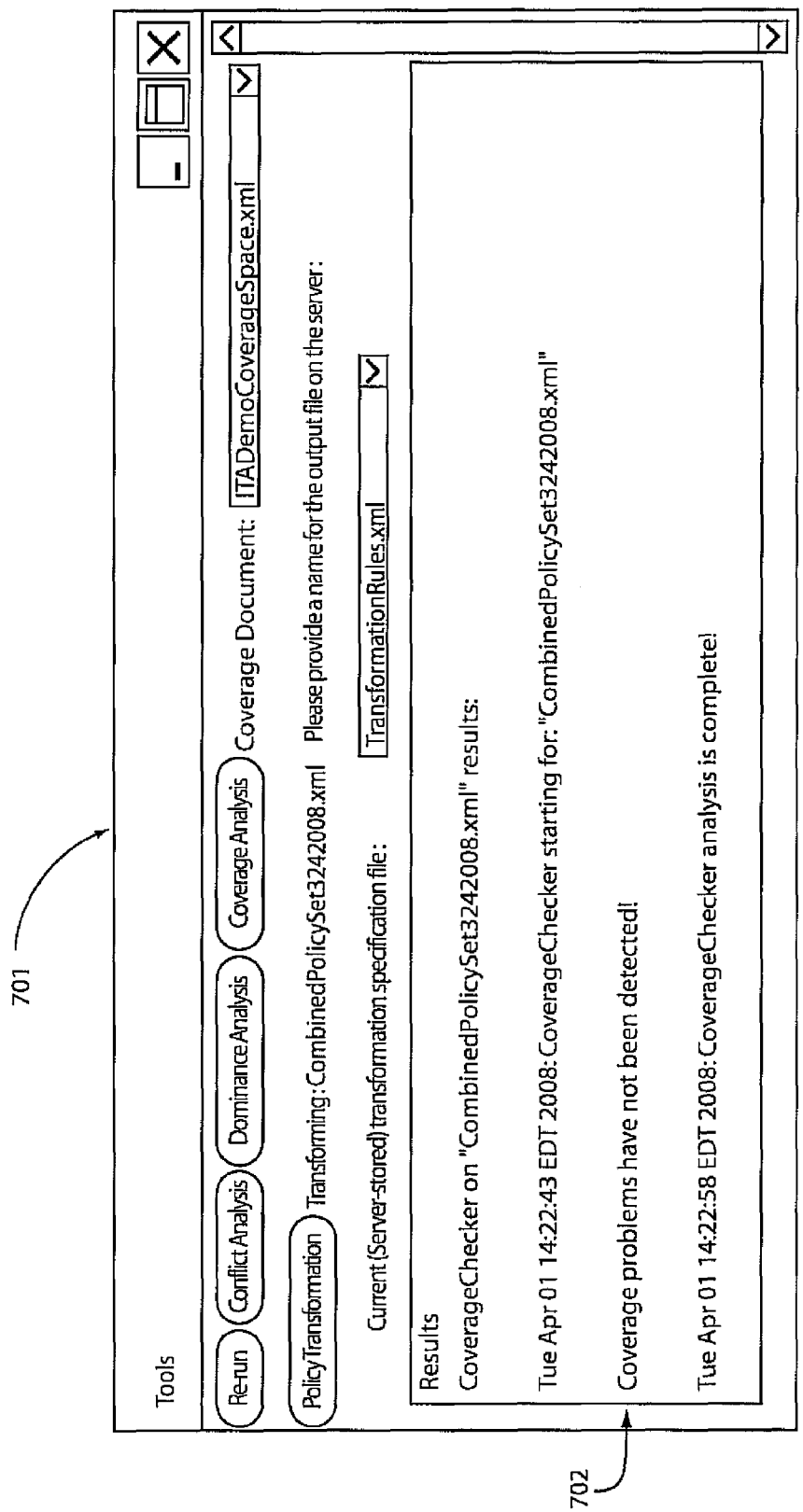
FIG. 7 shows an illustrative rendition of a dialog from a tool that performs coverage analysis, where the output shown in the dialog confirms that the policy set has complete coverage.

Referring to FIG. 7, a dialog 701 similar to that of FIG. 5 is depicted. However, dialog 701 indicates a statement 702 that the inclusion of the extra policy completed the coverage and consequently no coverage problems have been detected.

Figure 8:
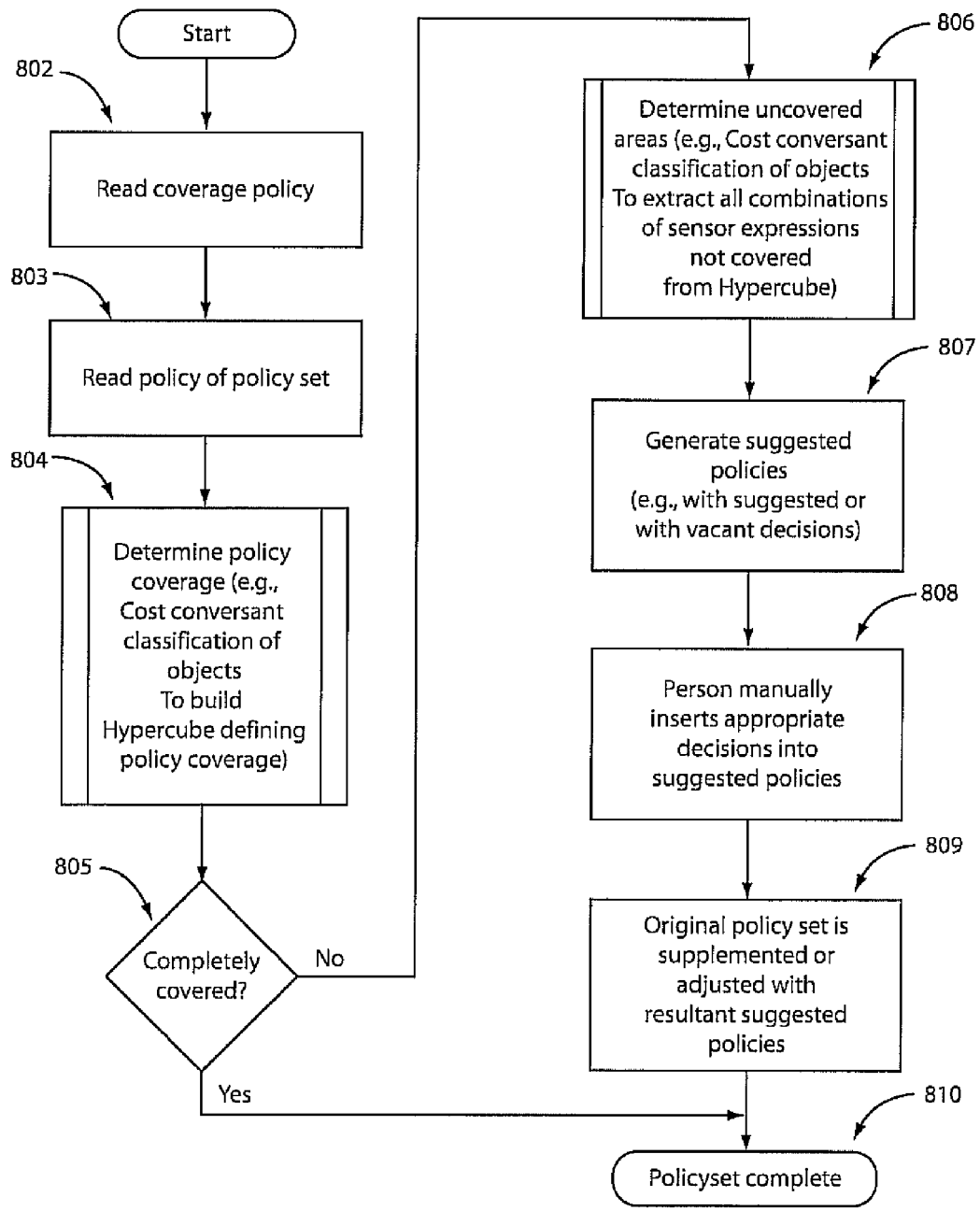
FIG. 8 is a block/flow diagram depicting a system/method for completing the coverage of policy sets, by utilizing in one illustrative example a hypercube/spanning tree methodology.

Referring to FIG. 8, a block/flow diagram shows a system/method for determining policy coverage and generating a suggested policy for gaps in policy coverage. In block 802, a supplied coverage policy is read. A policy set, comprised of at least one policy, is read in block 803. Together, the policies are each used to determine policy coverage in block 804. In one embodiment, the policies are employed to generate hypercubes by applying the teachings of U.S. Pat. No. 6,928,445 ('445). '445 describes a method for comparing the object classifications for hypercubes, side by side, thus allowing for the means to query coverage of one hypercube on the other and the discovery of the missing coverage from one hypercube to the other. Other methods may also be employed to decipher policy coverage and gaps.

In block 805, complete coverage is determined. This may include employing a coverage checking program, graphical determinations or checking value ranges. If the coverage is found to be complete, according to the coverage policy, then the policy set is concluded to be complete and goes to block 810. Otherwise, the space not covered is determined (e.g., extracted from the hypercubes) in block 806 and used to fabricate a new policy in block 807. The new policy may include a suggested policy, and suggested decisions. In one embodiment, the new policy is selected for each extracted difference hypercube. A plurality of policies may be provided and ranked in accordance with criteria. The appropriate policy may be selected by a user from a list or otherwise.

Block 807 may be performed without necessarily concluding or suggesting what decision should be rendered by the policy (empty decision). Instead, the suggested policies are preferably reviewed by a user and modified to include reasonable decisions in block 808. This is optional and the new policy may be selected in advance as a default policy or other rule, or polices may be employed to automatically select the policy to complete coverage.

After all suggested policies are noted and collected, the original policy set is expanded in block 809 to include the new policies, and the resultant policy set is generated.

It should be understood that although the depiction of dialogs and graphs are illustratively shown. These depictions and their descriptions should not be construed as limiting since other technologies and methods may be employed to implement the present embodiments. It is also to be understood that the present embodiments may be implemented and run on a general-purpose computer or computer system. The computer system may be any type of known or will be known systems and may include a processor, memory device, a storage device, input/output devices, internal buses, and/or a communications interface for communicating with other computer systems in conjunction with communication hardware and software, etc. The term "computer system" as may be used in the present disclosure may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present disclosure may include and may be included within fixed and portable devices such as desktops, laptops, and servers.

Having described preferred embodiments of a system and method for automatically generating suggested entries for policy sets with incomplete coverage (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for ensuring policy coverage, comprising:
   determining a policy coverage for one or more policies covering a region in a policy coverage space by building hypercubes defining policy coverage;
   determining at least one region not covered by the policy coverage in the policy coverage space with a processor by extracting regions not covered by the hypercubes;
   generating one or more suggested policies with a processor to cover at least one of the regions not covered by the policy coverage; and
   supplementing the policy coverage with the one or more suggested polices to complete a policy coverage region of the policy coverage space.

2. The method as recited in claim 1, wherein determining a policy coverage includes determining a policy coverage for each of the one or more policies and for the policy set.

3. The method as recited in claim 1, wherein generating one or more suggested policies includes selecting a policy based on historic data.

4. The method as recited in claim 1, wherein generating one or more suggested policies includes selecting a policy based on a likelihood that the policy is correct.

5. The method as recited in claim 1, further comprising manually inserting decisions into suggested policies.

6. The method as recited in claim 1, further comprising at least one of:
   identifying a redundant policy, and identifying conflicting policies in a set of policies specific set of conditions.

7. The method as recited in claim 6, further comprising adjusting at least one policy to correct an identified problem.

8. A non-transitory computer readable storage medium comprising a computer readable program for ensuring policy coverage, wherein the computer readable program when executed on a computer causes the computer to perform the steps of:
   determining a policy coverage for one or more policies covering a region in a policy coverage space by building hypercubes defining policy coverage;
   determining at least one region not covered by the policy coverage in the policy coverage space by extracting regions not covered by the hypercubes;
   generating one or more suggested policies to cover at least one of the regions not covered by the policy coverage; and
   supplementing the policy coverage with the one or more suggested polices to complete a policy coverage region of the policy coverage space.

9. The non-transitory computer readable medium as recited in claim 8, wherein determining a policy coverage includes determining a policy coverage for each of the one or more policies and for the policy set.

10. The non-transitory computer readable medium as recited in claim 8, wherein generating one or more suggested policies includes selecting a policy based on historic data.

11. The non-transitory computer readable medium as recited in claim 8, wherein generating one or more suggested policies includes selecting a policy based on likelihood that the policy is correct.

12. The non-transitory computer readable medium as recited in claim 8, further comprising inserting decisions into suggested policies.

13. The non-transitory computer readable medium as recited in claim 8, further comprising at least one of: identifying a redundant policy, and identifying conflicting policies in a set of policies specific set of conditions.

14. The non-transitory computer readable medium as recited in claim 8, further comprising adjusting at least one policy to correct an identified problem.

15. A method for generating suggested policies to fulfill policy gaps, comprising:
   defining a policy domain affecting a composition of a policy condition;
   defining applicable ranges of all attributes of policies in the policy domain as hypercubes in the policy domain using a processor;
   analyzing policies to determine if regions of the domain remain uncovered by the policies by extracting regions not covered by the hypercubes;
   generating at least one suggested policy with a processor to cover one of a condition gap that remains uncovered by the policies and conflicts between policies; and
   altering the policy domain to fill the condition gap or resolve conflicts between the policies.

16. The method as recited in claim 15, further comprising recommending a policy decision in accordance with similar policies within the policy domain.

17. The method as recited in claim 15, further comprising specifying an empty policy decision for the suggested policy.

18. The method as recited in claim 15, wherein the attributes include one or more of sensors, applicable temporal factors, and system state.

19. The method as recited in claim 18, wherein the attributes of the sensors include one or more of integers, floating point numbers, characters, and enumerated values.

20. The method as recited in claim 15, wherein generating at least one suggested policy includes ranking suggested policies based on criteria.

21. A non-transitory computer readable storage medium comprising a computer readable program, wherein the computer readable program when executed on a computer causes the computer to perform the steps of:
   defining a policy domain affecting a composition of a policy condition;
   defining applicable ranges of all attributes of policies in the policy domain as hypercubes in the policy domain;
   analyzing policies to determine if regions of the domain remain uncovered by the policies by extracting regions not covered by the hypercubes;
   generating at least one suggested policy with a processor to cover one of a condition gap that remains uncovered by the policies and conflicts between policies; and
   altering the policy domain to fill the condition gap or resolve conflicts between the policies.

* * * * *